United States Patent [19]

Landrigan

[11] 4,086,736

[45] May 2, 1978

[54] FIRE AND LIQUID SEALS FOR PIPES AND CONDUITS AND METHOD OF FORMING SAME

[75] Inventor: Larry P. Landrigan, La Cygne, Kans.

[73] Assignee: Daniel International Corporation, Greenville, S.C.

[21] Appl. No.: 751,326

[22] Filed: Dec. 16, 1976

[51] Int. Cl.$^2$ .......................... E04C 2/52; F16L 5/00; E04B 5/48

[52] U.S. Cl. ...................................... 52/221; 285/192; 248/56

[58] Field of Search .......................... 52/221, 302, 506; 428/388, 447; 128/156, 155; 264/46.4, 46.9, 46.6; 285/185, 192, 235, 236; 403/50; 248/56

[56] References Cited

U.S. PATENT DOCUMENTS

| | | | |
|---|---|---|---|
| 2,259,737 | 10/1941 | Cunningham | 113/116 |
| 2,882,183 | 4/1959 | Bond et al. | 428/447 |
| 3,648,692 | 3/1972 | Wheeler | 128/156 |
| 3,708,563 | 1/1973 | Sells | 264/46.9 |
| 3,807,110 | 4/1974 | Kaminski | 52/219 |
| 3,869,335 | 4/1975 | Siefert | 428/388 |
| 3,930,916 | 1/1976 | Shelley | 52/506 |

FOREIGN PATENT DOCUMENTS

| | | | |
|---|---|---|---|
| 863,195 | 3/1961 | United Kingdom | 285/192 |
| 262,532 | 12/1936 | United Kingdom | 174/93 |

OTHER PUBLICATIONS

Modern Plastics, May, 1954, vol. 31, Issue No. 9, pp. 133, 134, 136 and 141.

*Primary Examiner*—James L. Ridgill, Jr.

*Attorney, Agent, or Firm*—Mason, Fenwick & Lawrence

[57] ABSTRACT

A fire and/or liquid seal in a structural wall has a tube-like support extending through the wall with conduits positioned in the support and surrounded by insulation material in the form of silicone foam in one embodiment or packed ceramic fibers in another embodiment with protective shield means being clamped to the support and the conduits on the opposite sides of the wall; in another embodiment a layer of silicone elastomer is provided in a tube-like support extending through the wall adjacent a layer of silicone insulating foam surrounding conduits extending through the support in a penetration seal. A method of forming a seal in a horizontal building floor includes pouring of the foam in a tube-like support extending through the floor with the foam held in position by a cover across the lower edge of the opening, liquid elastomer poured on the upper surface of the foam eventually hardens to protect the foam layer but leaks through the foam before hardening to reveal any imperfections in the foam if such are present so that the plugging of such leaks followed by hardening of the liquid elastomer in the imperfection provides a seal that is free from leaks.

18 Claims, 14 Drawing Figures

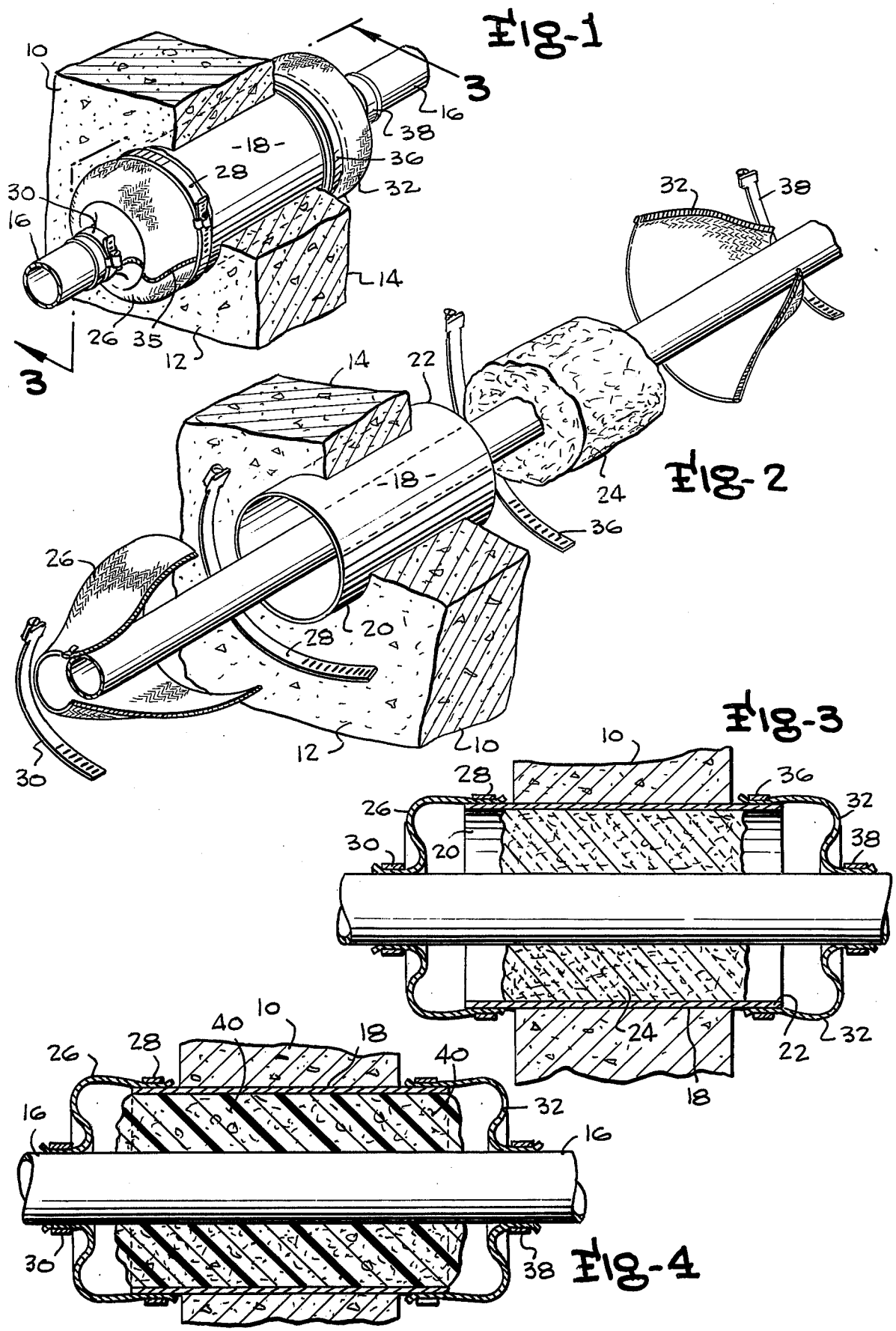

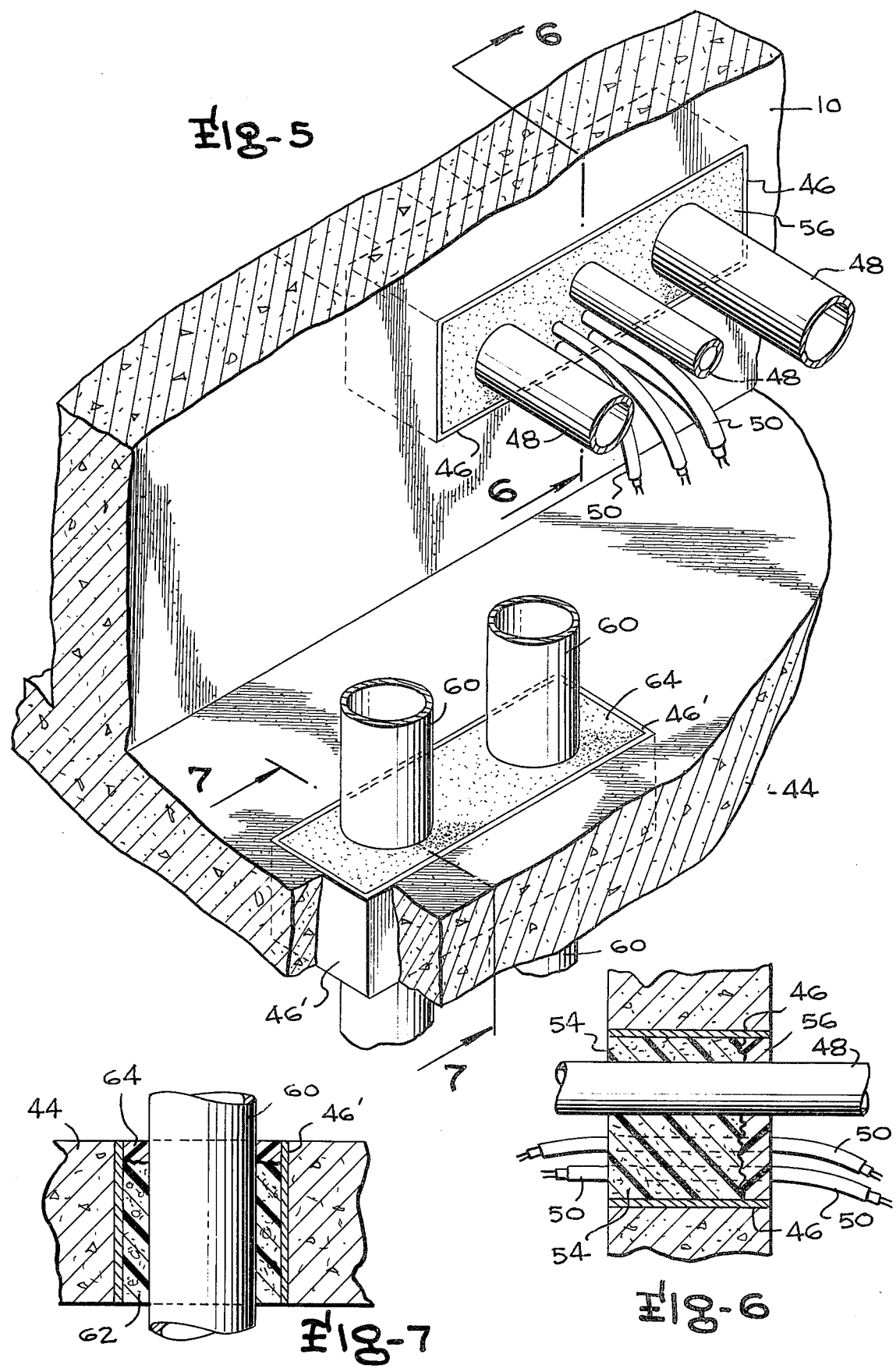

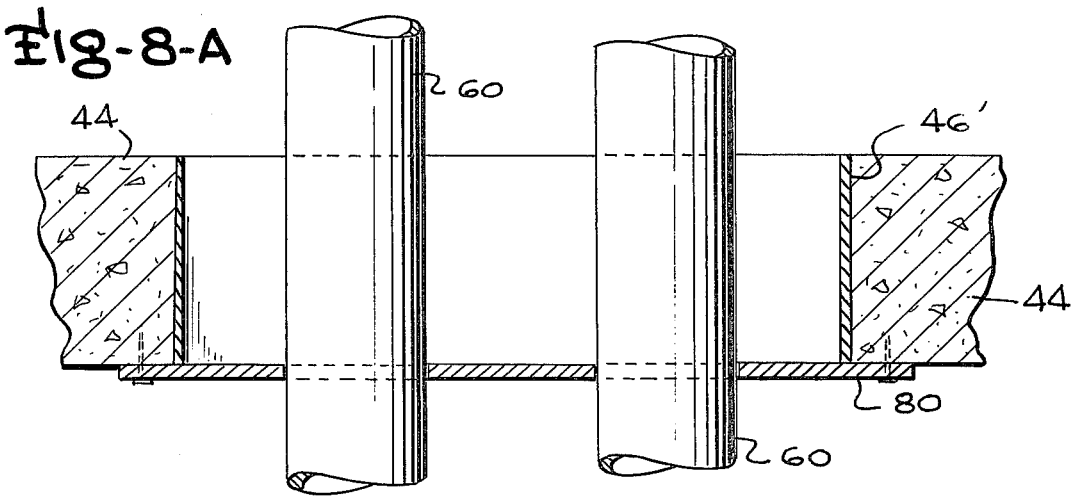
Fig-8-A
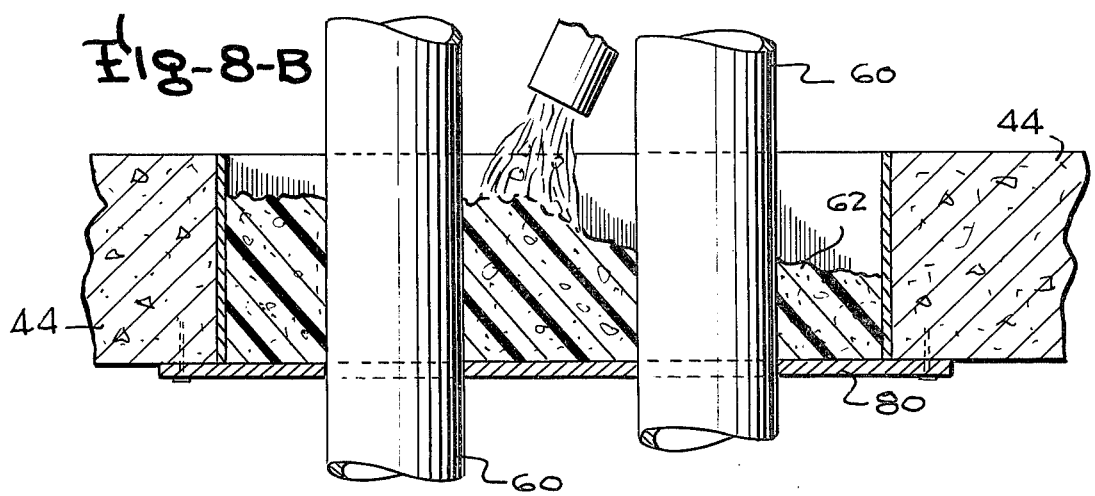
Fig-8-B
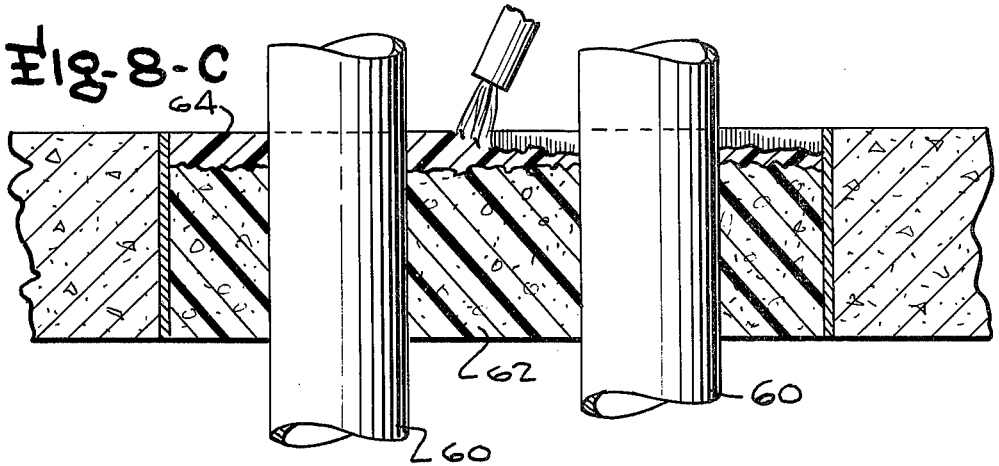
Fig-8-C

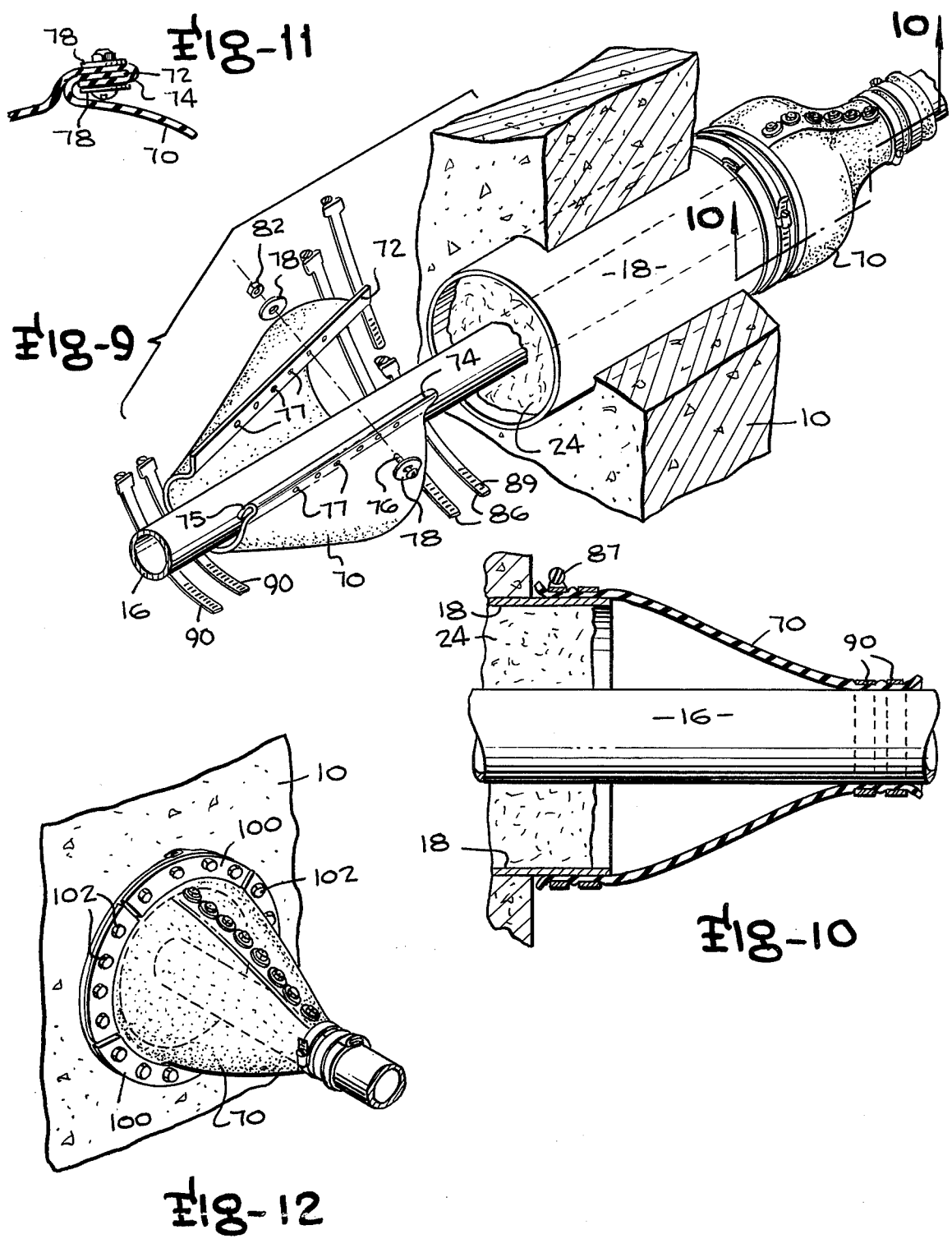

FIRE AND LIQUID SEALS FOR PIPES AND CONDUITS AND METHOD OF FORMING SAME

This invention is in the field of structural safety equipment and is specifically directed to the field of fire seals for use for preventing the passage of the hot gases of combustion and flame in the event of a fire through penetration openings provided in the walls and floors of buildings for electrical or plumbing conduits. It should be understood that the term "wall" is used throughout this application in its broadest sense to include vertical wall members, ceiling or floor members or inclined structural panels or surfaces of a building or the like. Additionally, the term "conduit" is used throughout the application in its broadest sense so as to include, but not be limited to, electrical conduits and liquid or gas piping or similar devices both pressurized and un-pressurized.

While modern building constructions employing reinforced concrete walls and floors provide substantial resistance to the passage of fire through such structural components, it is frequently necessary that penentration openings be provided in such structural components for permitting the passage of electrical conduits or cables or plumbing conduits through the structural walls or floors with such penetration openings providing a path for the spread of fire, water, gas or the like in the event of an accident with the hazard attendant to such openings in any building being dependent upon the number and nature of the seals in the building and its use. For example, both conventional and nuclear power plants employ large numbers of electrical conduits and cables along with piping and it is necessary, particularly in the case of nuclear installations, that the openings in the walls through which the cables, conduits or pipes extend be as fireproof and liquid and gas proof as possible in order to contain any fires or liquid spills to the fullest possible extent both for the safety of the operating personnel and in order to reduce damage in the event of a fire or other accident.

One of the primary problems with presently known seal constructions is that they are formed of rigid components and are consequently subjected to substantial forces created by thermal changes in the conduits or other components passing through the seal means. The substantial magnitude of such thermal expansion and contraction forces frequently results in the failure of the seal or the creation of minute cracks or the like which may not even be visible but which keep the seal from providing a satisfactory sealing function. Similarly, seismic shocks or other large vibrations could also destroy effectiveness of such rigid seals.

Another problem with prior known seal constructions is that they have simply consisted of silicone foam sprayed around conduits extending through a wall with the outer surface of the foam being rough and uneven so as to constitute an unexcelled dust collector. Not only is such dust unsightly, it is conductive and will deleteriously effect sensitive control signals and the like on conductors passing through the seal.

Another problem with the prior known seal constructions arises from the fact that it is frequently necessary to extend new conduits through a wall penetration at a later date after the installation of the seal and in many of the presently known devices, the only way in which such an installation can be effected is by removal and replacement of the existing seal. Needless to say, such a replacement procedure involves substantial expense both in time and material.

Yet another problem of the previously known seal constructions is that it is extremely difficult to ascertain if the seal has any imperfections and is actually providing a satisfactory sealing function. While sophisticated test equipment can be used for this purpose, the use of such equipment is also undesirably expensive and time consuming. At present, there is no known means available in the prior art for insuring at the time the seal is formed that the seal will provide an effective sealing function.

Therefore, it is the primary object of this invention to provide a new and improved seal means for penetration openings in structural walls.

Another object of the invention is the provision of a new and improved method of forming a fire seal in a structural wall component.

A further object of the invention is the provision of a method of forming a penetration seal which at the time of formation indicates any imperfections in the seal and inherently effects correction of such imperfections.

Yet another object of the invention is the provision of a new and improved penetration seal which is flexible so as to accommodate thermal expansion and contraction or other forces applied by memebers passing through the seal.

Another object of the invention is the provision of a new and improved penetration seal construction which can easily accommodate new conduits or the like passing through the seal without the need for a new seal.

Obtainment of the objects of this invention is enabled through the provision of a body of thermal insulation material in a structural wall penetration opening through which conduits extend. The conduits are positioned to extend through the opening in the structural wall and a quantity of insulating material is then provided in the opening fully filling the opening and surrounding the conduits. Shielding means for the insulating material is then provided along at least one side of the penetration opening in the structural wall for protecting the insulation from mechanical damage and in some instances for providing a gas seal function across the penetration opening. The body of insulation material can consist of a packed mass of ceramic fibers in some instances or can alternatively be in the form of silicone foam which is positioned in the opening in the structural wall member and permitted to set. When the penetration opening occurs in a horizontal structural wall such as a floor, a unique method of forming the shield achieves both the formation of the shield and provides both an indication of whether or not the seal is liquid and/or gas tight and a means for correcting any such imperfections.

More specifically, such shields are formed by initially positioning a plywood, aluminum or other type support sheet having apertures to be fitted about the conduits extending through the structural wall opening beneath the opening and adjacent the lower surface of the structural wall in which the opening is provided. The support sheet permits the subsequent pouring of silicone foam in the penetration opening to extend upwardly from the support sheet for a substantial distance usually greater than half the thickness of the structural wall member. Upon setting of the silicone foam, which occurs relatively rapidly, a layer of silicone elastomer is poured over the upper surface of the silicone foam in liquid form. Any voids or openings extending through the foam will permit the liquid silicone elastomer to flow downwardly through the foam and be detected so as to indicate the imperfection in the silicone foam. The lower end of the imperfection through which the silicone elastomer flows is then plugged with a small quantity of ceramic wool or other material capable of closing the opening and restraining and holding the elastomer until it sets. After the elastomer hardens, it consequently fills the imperfection and provides a complete seal to correct the previously existing imperfections in the foam.

A better understanding of the manner in which the embodiments of the invention achieve the objects of the invention will be obtained when the following written description is considered in conjunction with the appended drawings in which:

FIG. 1 is a perspective view of a first fire seal embodiment of the invention mounted in a structural wall with portions removed for clarity;

FIG. 2 is an exploded perspective view of the embodiment of FIG. 1;

FIG. 3 is a sectional view taken along lines 3—3 of FIG. 1;

FIG. 4 is a sectional view similar to FIG. 3 but illustrating a different insulation material from that of the seal of FIGS. 1-3;

FIG. 5 is a perspective view of another embodiment of the invention mounted in the wall and floor portions of a structure;

FIG. 6 is a sectional view taken along line 6—6 of FIG. 5;

FIG. 7 is a sectional view taken along line 7—7 of FIG. 5;

FIG. 8-A is a bisecting sectional view illustrating a preliminary step in the provision of a fire seal of the type illustrated in the lower portion of FIG. 5;

FIG. 8-B is a bisecting sectional view similar to FIG. 8-A illustrating a second step in the formation of the lower seal of FIG. 5;

FIG. 8-C is a bisecting sectional view illustrating the final step in the formation of the lower seal means of FIG. 5;

FIG. 9 is an exploded perspective view of another embodiment similar to the embodiment of FIGS. 1 through 4;

FIG. 10 is a sectional view taken along lines 10—10 of FIG. 9;

FIG. 11 is an enlarged transverse sectional view of a portion of the shield or boot of the embodiment of FIG. 9; and FIG. 12 is a perspective view of an alternative method of attaching a shield of boot of the embodiment of FIGS. 9 etc. to a structural wall component.

Attention is initially invited to FIG. 1 in which a structural wall component 10 is provided with a penetration opening extending between a first side 12 of the wall and a second side 14 of the wall for permitting the passage of a conduit 16. A supporting member in the form of a metal support pipe 18 extends through the wall 10 and would normally be provided in the wall at the time the wall is poured during the construction of the wall. In some instances it is not necessary to use pipe 18 as will be discussed hereinafter. However, in the embodiment of FIGS. 1-4, it will be observed that the conduit 16 is positioned axially within the support pipe 18 and a support beam or the like could be provided internally of pipe 18 for supporting the conduit 16 if such should be necessary. Pipe 18 has a first end 20 extending outwardly of the first wall surface 12 and a second end 22 extending outwardly of the second wall surface 14, however, such an extension beyond the wall is not always essential as will be discussed hereinafter.

A body of insulation material 24 consisting of ceramic fibers is closely packed and stuffed around the outer surface of the conduit 16 and is tightly packed to snugly fill the space between conduit 16 and the inner surface of the pipe 18. The body 24 of ceramic fibers used in the embodiment of FIGS. 1-3 is preferably formed of kaolin and alumina-silica fibers sold under the trademark KAOWOOL by Babcock & Wilcox Company, New York, N.Y.; however, other similar materials such as sold by Johns Manville Company could also be employed if desired.

A first shield or boot consisting of an aluminized conical fiberglass member 26 is clamped to the first end 20 of metal support pipe 18 by a first band-type stainless steel clamp means 28 while the opposite end of the shield member or boot 26 is clamped by a second band-type stainless steel clamp means 30 to the outer surface of conduit 16. The shield or boot member 26 is unitarily formed of flexible material in conical shape and a liquid and gas tight connection over zipper 35 is effected by coating zipper 35 with silicone, rubber or other similar settable material after the member 26 is in position.

Similarly, the second shield or boot 32 is mounted on the opposite side of the structural wall member 10 and is held in position by first and second band-type stainless steel clamp members 36 and 38 respectively clamping the boot 32 to the end 22 of the metal support pipe 18 and the outer surface of the conduit 16. The boots or shields 26 and 32 are formed of the same material which is preferably of the type sold under the designation CEP-11248 by the Johns Manville Company.

With the shield in the position illustrated in FIGS. 1 through 3, tests have proven that while the existence of high temperature flame and combustion on one side of the wall 10 will destroy the boot or shield on that side of the wall, the remaining boot on the other side of the wall is protected from the high temperature and provides a gas and liquid seal to prevent the spread of the combustion through the penetration opening.

FIG. 4 illustrates another version of the embodiments of FIGS. 1-3 in which a different insulation material consisting of a body 40 of silicone foam which is provided in place of the ceramic fibers 24. Otherwise, the embodiment of FIG. 4 is exactly identical to the embodiment of FIGS. 1-3 and the same reference numerals are consequently employed for the corresponding parts. The embodiment of FIG. 4 provides the same fireproofing seal qualities as the embodiments of FIGS. 1-3. The body 40 of silicone foam is preferably of the type sold under the designation 6548-A'B by Dow Corning and under the trademark SEMCO PR-855 by Semco Company of Glendale, Calif.

FIG. 5 illustrates two similar embodiments of the invention including a vertical wall penetration seal mounted in a vertical structural wall member 10 and another penetration seal means mounted in a horizontal floor portion 44 of a building. The seal means mounted in the vertical wall 10 comprises a tube-like support means 46 formed of metal and quadrilateral cross-sectional configuration; however, the cross-sectional shape of means 46 can vary with other shapes being employed and with means 46 being omitted in some instances. A plurality of conduits including pipes 48 and cables 50 extend through the support means 46 and are surrounded by a body of insulation material 54 formed of silicone foam of the same composition as body 40 of the embodiment of FIG. 4. Protective means comprising a smooth easily cleaned shield 56 of silicone elastomer is provided on one or both sides of the foam 54 to provide strength and protection for the foam. The single layer of silicone elastomer is illustrated but layers on both sides of foam 54 can be used if desired. The elastomer is formed of material having a low ablation rate and is preferably material sold under the trademark SLY-GARD 170 A & B as manufactured by Dow-Corning or RTV-627 by the Silicone Products Department of the General Electric Company, Waterford, New York. Alternatively, a layer of silicone elastomer 56 can also be provided on the other side of the foam layer as previously noted and internal support means can be provided on the interior of the tube-like support member 46 if the weight of the conduits is sufficient to dictate the use of such.

FIG. 7 illustrates a similar embodiment provided in a horizontal floor portion of the building 44 in which a tube-like support 46' identical to member 46 of the previous embodiment is positioned. A pair of conduits 60 extends through the member 46' and a body of insulation material formed of silicone foam 62 contained within member 46' and formed of the same material as body 40. Additionally, shielding means consisting of a layer of silicone elastomer 64 is formed of the same material as shield 56 is provided along the upper surface of the layer of foam 62 for providing protection of the foam against mechanical damage and provides a smooth surface for easy cleaning to prevent the buildup of dust.

FIGS. 8-A, 8-B and 8-C illustrate the manner in which the penetration seal of FIG. 5 is provided in the horizontal floor component 44 of the building. FIG. 8-A illustrates the initial step in the fabrication process in which a temporary cover such as a sheet of plywood, aluminum or the like is fitted about the conduits 60 and secured to the lower surface of the floor section 44. It should be understood that the tube-like support 46' has already been placed in position in the floor section 44 preferably during the construction of the building and that sheet 80 may be formed of two or more parts to permit positioning about the conduits. The interior of the member 46' is then filled with silicone foam 62 as shown in FIG. 8-B with the upper surface of the foam 62 being below the upper surface of structural floor panel 44; the foam is then permitted to cure in position. Subsequently, liquid uncured silicone elastomer 64 is poured on top of the foam layer 62 as shown in FIG. 8-C and is permitted to cure for several hours.

The liquid uncured silicone elastomer is essentially identical to the foam material 62 but does not include a blowing agent and is much more slow to cure. However, the liquid elastomer is free flowing at the time of its pouring so that any imperfections in the seal will be filled with elastomer which will flow downwardly under the action of gravity. Any openings through which the liquid, uncured silicone elastomer is flowing can be easily plugged by the use of ceramic fibers or other suitable material to stop such flow so that the subsequent setting and hardening of the elastomer in the imperfection will result in a permanent sealing of the imperfection to provide a resultant air tight and liquid tight seal construction. Upon hardening of the silicone elastomer 64, a strong and smooth external surface is provided which can be easily cleaned while protecting the layer of foam material 62 beneath the elastomer layer in an obvious manner.

Turning now to FIGS. 9 through 12, it is to be noted that these figures illustrate another embodiment of the invention that is similar to the embodiments of FIGS. 1 through 4 but which use a modified boot construction 70. In this embodiment the pipe 18 as used in the first embodiment in which a conduit 16 is extended through the pipe in an axial manner as shown. Each of the shield or boot members 70 are formed of silicone rubber materials such as manufactured by Garlock or others and can alternatively be reinforced with cords or wires to provide additional strength. Each of the members 70 is constructed so that it can be attached to the pipe 18 in the conduit 16 but is removable from the pipe and is reusable at any time. It is to be noted that the interior of the pipe 18 is tightly packed with ceramic fibers such as fibers 24 of the first embodiment; however, silicone foam such as silicone 40 of FIG. 4, could also be employed if desired.

Each of the boots or shields 70 comprises a split, conical member formed of flexible rubber which is split along one edge its entire length so as to permit the shield to be fitted about the pipe as illustrated by the shield nearest the viewer in FIG. 9. One edge 72 of the shield 70 is a flat planar portion while the other edge is a folded over U-shaped portion 74 defining an elongated slot 75 (FIG. 9) in which the flat planar portion 72 is received. Aligned apertures 77 in the edge portions 72 and 74 permit the passage of clamp bolt members 76 through the edges 72 and 74 with two washers 74 on each bolt being positioned on the opposite sides of the U-shaped portion 74. Nut members 82 are received on bolts 76 and when tightened serve to sealingly clamp edges 72 and 74 together.

Stainless steel clamps 86, which are of the same type employed in the embodiments of FIGS. 1-4, are fitted about the outer surface of the base end of the shield 70 which is positioned over pipe 18 so that tightening of the clamps 86 provides an effective seal between the shield and the pipe member. The stainless steel clamp members 86, which are of the type frequently used for automobile hose connectors, have a spiral worm on one end which is engagable with slots 89 in the opposite end for effecting tightening of the band. A plurlity of the clamp bands 86 is used in end-to-end connection when the pipe 18 is of relatively large size so that the clamping operation can be effected at a plurality of circumferential locations about the periphery of the seal 70 in an obvious manner. In smaller installations, the clamp bands need not be placed in the end-to-end relation and only a single adjustment is necessary to effect the necessary sealing functions. Similarly, a pair of clamp members 90 are provided for sealing the boot 70 to the conduit 16.

While the embodiments of FIGS. 1 through 4 only illustrate single clamp members 28 and 30, which are identical to clamps 86, for clamping the boots of those embodiments to the conduit and pipe members, plural bands such as illustrated in FIG. 9, can also be employed in the embodiments of FIGS. 1-4 in the same manner as they are employed in FIGS. 9 etc. Moreover, such bands can also be connected in end-to-end manner as discussed above.

FIG. 12 illustrates another method by which the boot 70 can be sealingly connected to the structural wall component 10. Specifically, a series of arcuate clamp plates 100 are positioned about the periphery of the large end of the seal members 70 and are clamped to the wall 10 by lag bolts or the like 102 in an obvious manner. In this version, the pipe 18 might be provided with an end surface flush with the surface of the wall 10 or could alternatively be simply eliminated entirely. Moreover, the manner of fixing the seal 70 to the structural wall component 10 illustrated in FIG. 12 can also be employed with the embodiments illustrated in FIGS. 1 through 4 which could also use pipe 18 having an end flush with the wall surface or could eliminate the pipe 18 entirely if desired.

A significant aspect of all embodiments of the invention employing the boot or shield members is the use of a boot or shield such as members 26 or 70 on both sides of the wall 10. While the material of which the boots or shields 26 and/or 70 are formed is capable of being consumed by combustion on one side of the wall, the presence of the other shield on the opposite side of the wall prevents the leakage of hot gases through the wall. The thermal insulation components protect the shield on the cold side of the wall so that effective gas seal protection is achieved by the remaining shield notwithstanding the fact that the other shield may have been consumed by the fire.

It should be understood that numerous modifications of the subject invention will undoubtedly occur to those of skill in the art and it should be understood that the spirit and scope of the invention is to be limited solely by the appended claims.

I claim:

1. A fire seal for a structural wall penetration comprising a support pipe of circular cross-section embedded in and extending through a structural wall, a conduit of circular cross-section of smaller size than said support pipe oriented in and extending through said support pipe with the outer wall of said conduit being spaced from the inner wall of said support pipe, a packing of heat resistant thermal insulation material comprising a body of silicone foam occupying the space between the outer wall of said conduit and the inner wall surface of said support pipe, a first flexible boot means extending between one end of said support pipe and said conduit on one side of and externally of said structural wall, inelastic fastening means for clampingly and sealingly fastening said first flexible boot means to said support pipe and said conduit, a second flexible boot means positioned externally of said structural wall extending between a second end of said support pipe and a second end of said conduit on the opposite side of said structural wall from said first flexible boot, second inelastic fastening means clampingly and sealingly fastening said second flexible boot means to said second end of said support pipe and said second end of said conduit.

2. The invention of claim 1 wherein said first and second fastening means comprise stainless steel band-type clamps.

3. The invention of claim 1 wherein said flexible boot means is formed of aluminum coated silicone glass fiber.

4. The invention of claim 1 wherein said boot means are formed of silicone rubber.

5. A fire seal for a structural wall penetration comprising hollow support means embedded in and extending through a structural wall-like member and having an internal volumetric space extending through said structural wall and having an outer peripheral boundary defined by an inner wall of the support means, a conduit oriented in and extending through said volumetric space of said support means with the outer wall of said conduit being spaced from said support means, a packing of thermal insulation material comprising a body of silicone foam occupying the volumetric space between the outer wall of said conduit and the inner wall surface of said support means and shielding means immediately adjacent said packing of thermal insulation material comprising a layer of silicone elastomer extending across the space between said outer wall of the conduit and the inner wall of the support means for protecting said thermal insulation material from the direct impingement of flame or hot gases thereon in the event of a fire adjacent said structural wall-like member.

6. The invention of claim 5 wherein said support means comprises a tube-like means of quadrilateral cross-sectional configuration.

7. The invention of claim 5 wherein said structural wall-like member comprises a floor portion, said hollow support means comprises a metal tube-like means embedded in said floor portion, said body of silicone foam is positioned in the lower extent of said tube-like means of said layer of silicone elastomer overlies and is bonded to said body of silicone foam.

8. A gas and liquid type seal for a structural wall penetration opening through which a conduit of smaller size than the penetration opening extends, said seal comprising a packing of thermal insulation material occupying the space between said conduit and the surface of the penetration opening, a first flexible boot means connected on one end by wall attachment means to one side of said wall adjacent said penetration opening, a second flexible boot means connected to the opposite side of said wall by clamp members and inelastic clamping means for clamping the ends of said flexible boot members opposite their connection to the wall to said conduit at a location spaced outwardly from the plane of the wall surface to which the second flexible boot means is connected for providing a sealed connection of said second boot means to said conduit.

9. The invention of claim 8 wherein said flexible boot means each comprises a conically shaped rubber sleeve having separable edge portions extending along its length so as to permit said sleeve to be positioned about said conduit and a plurality of clamping connector means extending through said edge portions of said shield to clamp said edge portions together to provide a resultant sealed connection between said edge portions.

10. The invention of claim 9 wherein said wall attachment means comprises a plurality of arcuate clamps and a plurality of bolts mounted in said wall and passing through said clamps and to the edge of said conically shaped rubber sleeve for clamping said sleeve to said wall.

11. The invention of claim 8 wherein said first and second flexible boot means are each of conical shape and have two separable edge portions permitting said boots to be positioned over said conduit, one of said separable edge portions being of U-shaped configuration defining a slot in which the other edge portion is received and edge clamping means for clamping said edge portions together to provide a sealed juncture between said edge portions.

12. The invention of claim 11 wherein said wall attachment means comprises arcuate clamp members forcefully urging one end of said boot members against said wall.

13. The invention of claim 12 wherein said packing of thermal insulation material comprises a body of ceramic fibers.

14. A fire seal for a structural wall penetration comprising a support pipe of circular cross-section embedded in and extending through a structural wall, a conduit of circular cross-section of smaller size than said support pipe oriented in and extending through said support pipe with the outer wall of said conduit being spaced from the inner wall of said support pipe, a packing of thermal insulation material comprising a body of ceramic fibers occupying the space between the outer wall of said conduit and the inner wall surface of said support pipe, a first flexible boot means extending between one end of said support pipe and said conduit on one side of and externally of said structural wall, inelastic fastening means for clampingly and sealingly fastening said first flexible boot means positioned externally of said structural wall extending between a second end of said support pipe and a second end of said conduit on the opposite side of said structural wall from said first flexible boot, second inelastic fastening means clampingly and sealingly fastening said second flexible boot means to said second end of said support pipe and said second end of said conduit.

15. The invention of claim 14 wherein said first and second inelastic fastening means comprise stainless steel band-type clamps.

16. The invention of claim 15 wherein said first and second flexible boot means are each of conical shape and have two separable edge portions permitting said boots to be positioned over said support pipe and conduit, one of said separable edge portions being of U-shaped configuration defining a slot in which the other edge portion is received and edge clamping means for clamping said edge portions together to provide a sealed junction between said edge portions.

17. The invention to claim 16 wherein said edge clamping means comprises a plurality of nut and bolt assemblies.

18. The invention of claim 17 wherein said boot means are formed of silicone rubber.

* * * * *